United States Patent
Shoemaker et al.

(10) Patent No.: US 10,134,044 B1
(45) Date of Patent: Nov. 20, 2018

(54) COLLECTION AND USE OF FINE-GRAINED USER BEHAVIOR DATA

(75) Inventors: Austin Shoemaker, Mountain View, CA (US); Soujanya Bhumkar, Palo Alto, CA (US); Aditya Rathnam, Mountain View, CA (US); Arthur Zwiegincew, Woodside, CA (US)

(73) Assignee: EXCALIBUR IP, LLC, New York, NY (US)

( * ) Notice: Subject to any disclaimer, the term of this patent is extended or adjusted under 35 U.S.C. 154(b) by 691 days.

(21) Appl. No.: 12/472,270

(22) Filed: May 26, 2009

Related U.S. Application Data (60) Provisional application No. 61/056,815, filed on May 28, 2008.

(51) Int. Cl.
*G06Q 30/02* (2012.01)
*G06K 17/00* (2006.01)

(52) U.S. Cl.
CPC ......... *G06Q 30/02* (2013.01); *G06Q 30/0254* (2013.01); *G06K 2017/0096* (2013.01)

(58) Field of Classification Search
CPC .................................................... G06Q 30/02
See application file for complete search history.

(56) References Cited

U.S. PATENT DOCUMENTS

| | | | |
|---|---|---|---|
| 5,339,390 A | 8/1994 | Robertson et al. | |
| 5,621,906 A | 4/1997 | O'Neill et al. | |
| 5,623,588 A | 4/1997 | Gould | |
| 5,937,419 A | 8/1999 | Oshiro et al. | |
| 6,198,483 B1 | 3/2001 | Launais | |
| 6,295,064 B1 | 9/2001 | Yamaguchi | |
| 6,496,842 B1 | 12/2002 | Lyness | |
| 6,747,680 B1 | 6/2004 | Igarashi et al. | |
| 7,664,739 B2 | 2/2010 | Farago et al. | |
| 2003/0081012 A1 | 5/2003 | Chang | |
| 2004/0158555 A1 | 8/2004 | Seedman et al. | |
| 2005/0278656 A1 | 12/2005 | Goldthwaite et al. | |
| 2006/0048073 A1 | 3/2006 | Jarrett et al. | |
| 2008/0022229 A1 | 1/2008 | Bhumkar et al. | |

(Continued)

OTHER PUBLICATIONS

U.S. Appl. No. 61/205,031, filed Jan. 13, 2009.

(Continued)

*Primary Examiner* — Patricia H Munson
(74) *Attorney, Agent, or Firm* — James J. DeCarlo; Greenberg Traurig, LLP (57) ABSTRACT

A user behavior monitoring module logs the operation of an image browser and sends the logged information to a personalization system. The personalization system includes a monitoring management module, a client statistics data store, a recommender system, and a content refinement module. The monitoring management module receives the logged information sent by the user behavior monitoring module and stores it in the client statistics data store. The recommender system determines user preferences based on the information stored in the client statistics data store. The content refinement module refines a set of content items based on the user preferences determined by the recommender system. The set is refined so that the resulting content items (and their ordering) are more relevant to the user operating the image browser. The refined set of content items is displayed to the user by the image browser.

15 Claims, 4 Drawing Sheets

(56) References Cited

U.S. PATENT DOCUMENTS

| | | |
|---|---|---|
| 2008/0091526 A1 | 4/2008 | Shoemaker |
| 2008/0092054 A1 | 4/2008 | Bhumkar et al. |
| 2008/0155475 A1 | 6/2008 | Duhig |
| 2008/0162200 A1* | 7/2008 | O'Sullivan et al. ............... 705/7 |
| 2008/0207182 A1* | 8/2008 | Maharajh et al. ......... 455/414.1 |
| 2008/0222558 A1 | 9/2008 | Cho et al. |
| 2008/0235594 A1 | 9/2008 | Bhumkar et al. |
| 2009/0006363 A1 | 1/2009 | Canny et al. |
| 2009/0300139 A1 | 12/2009 | Shoemaker et al. |
| 2010/0171691 A1 | 7/2010 | Cook et al. |

OTHER PUBLICATIONS

Adomavicius, G. et al., "Toward the Next Generation of Recommender Systems: A Survey of the State-of-the-Art and Possible Extensions," IEEE Transactions on Knowledge and Data Engineering, Jun. 2005, pp. 734-749, vol. 17, No. 6.

Google, Inc., "Protocol Buffers: Developer Guide," [Online] [Retrieved from the Internet on Jan. 20, 2010] Retrieved from the Internet URL < http://code.google.com/apis/protocolbuffers/docs/overview.html>, 3 pages.

Gunduz, S. et al., "A Web Page Prediction Model Based on Click-Stream Tree Representation of User Behavior," Proceedings of the Ninth ACM SIGKDD International Conference on Knowledge Discovery and Data Mining, Aug. 24-27, 2003, Washington, D.C., 6 pages.

Hallam-Baker, P. et al, "Extended Log File Format" (W3C Working Draft WD-logfile-960323), [Online] [Retrieved from the Internet on Jan. 20, 2010] Retrieved from the Internet URL < http://www.w3.org/TR/WD-logfile>, 6 pages.

Jung, M. et al., "Genetic Recommend Generating Method with Real-time Fitness Function Adaption," International Journal of u- and e-Service, Science and Technology (IJUNESST), pp. 9-16, vol. 1, No. 1.

Limbeck, P. et al., "Solution Architecture for Visitor Segmentation and Recommendation Generation in Real Time," E-Commerce and Web Technologies: 9th International Conference, EC-Web 2008, Lecture Notes in Computer Science (LNCS) 5183, 2008, pp. 102-113.

Shahabi, C. et al., "Knowledge Discovery from Users Web-Page Navigation," 7th International Workshop on Research Issues in Data Engineering, Apr. 7-8, 1997, 10 pages.

W3C, "Logging Control in W3C httpd," [Online] [Retrieved from the Internet on Jan. 20, 2010] Retrieved from the Internet URL < http://www.w3.org/Daemon/User/Config/Logging.html>, 3 pages.

Yahoo! Inc., "Media RSS Module—RSS 2.0 Module," [Online] [Retrieved from the Internet on Jan. 20, 2010] Retrieved from the Internet URL <http://video.search.yahoo.com/mrss>, 12 pages.

Cooliris, Inc., "PicLens: Immersive Slideshows Across the Web," Dec. 24, 2007, two pages [Online] [Retrieved Jul. 23, 2012] Retrieved from the Internet <URL:http://web.archive.org/web/20071224084314/htttp://wwww.piclens.com/site/firefox/mac/.>.

Guiard, et al., "Allowing Camera Tilts for Document Navigation in the Standard GUI: A Discussion and an Experiment," International Working Conference on Advanced Visual Interfaces, May 23-26, 2006, pp. 241-244, Venezia, Italy.

Norbert, C., "PicLens demo," Jan. 6, 2008, two pages, available at http://www.youtube.com/watch?v=Bpbh8_tNXEk.

Rekimoto, J. "Tilting Operations for Small Screen Interfaces," *Sony Computer Science Laboratory, Inc.*, 1996, two pages. [Online] Retrieved from the Internet <URL:http://www.sonycsl.co.jp/person/rekimoto/papers/uist96.pdf.>.

United States Office Action, U.S. Appl. No. 12/590,187, dated Nov. 28, 2011, thirty-one pages.

United States Office Action, U.S. Appl. No. 12/590,187, dated Aug. 16, 2012, twenty pages.

United States Office Action, U.S. Appl. No. 12/590,187, dated Oct. 9, 2013, twenty-eight pages.

* cited by examiner

COLLECTION AND USE OF FINE-GRAINED USER BEHAVIOR DATA

CROSS-REFERENCE TO RELATED APPLICATION

This application claims the benefit of U.S. Provisional Application No. 61/056,815, filed May 28, 2008, entitled "Methods and Systems for Discovering Internet-Based Content," the entire disclosure of which is hereby incorporated by reference herein, including any appendices or attachments thereof, in its entirety for all purposes.

BACKGROUND

Field

This invention pertains in general to monitoring user behavior and, more specifically, to monitoring the behavior of a user browsing and/or interacting with visual content.

Description of the Related Art

Users interact with software applications in a variety of ways, such as via keyboards and pointing devices. When a pointing device is used to "click" items that are shown on a display, the history of the clicks is sometimes referred to as a "clickstream." Information regarding a clickstream includes, for example, when each click occurred and what was clicked on.

One type of clickstream information concerns a user's web browsing behavior. A web server can track requests that it receives from web browsers and record information about each request, such as the Internet Protocol (IP) address of the device that sent the request and when the request was received. This information indicates the behavior of the user who was using the device at the time.

Sometimes a user's lack of activity is just as important as the activity itself. For example, if a user requests a first web page and then requests a second web page soon thereafter, then the time that the user spent viewing the first web page was relatively short. On the other hand, if a user requests a first web page and then doesn't request a second web page for a while, then the user spent more time viewing the first web page.

The way in which a user's behavior is monitored affects the type of information that can be collected. For example, while server-side monitoring provides some information about user behavior, that information is far from complete. If a user navigates to a web page that he visited recently, the page might be retrieved from a local cache rather than requested from a web server. A server-side monitor would not be able to detect this behavior.

Different monitoring technologies collect different types of user behavior information in various levels of detail. As the monitoring technologies become more sophisticated, so does the user behavior information that they collect. This user behavior information can then be used in new ways.

Although web browsers have been discussed above, user behavior monitoring can be used with any type of software application.

SUMMARY

The above and other needs are met by methods, computer program products, and systems in which the operation of a software application (e.g., an image browser) is logged. Since the image browser is controlled by a user, the operation of the image browser indicates that user's behavior. The behavior, in turn, indicates the user's preferences.

A user behavior monitoring module logs the operation of an image browser and sends the logged information to a personalization system. The personalization system analyzes the information to determine the user's preferences. The determined preferences are used to determine which content items should be displayed to the user by the image browser.

An embodiment of the user behavior monitoring module includes a monitoring control module, a user events data store, and a configuration file. The monitoring control module logs information about operation of the image browser. The logged information is in the form of "events" and is stored in the user events data store. The monitoring control module sends the logged information to the personalization system when a trigger occurs. The monitoring control module operates in accordance with various settings that are stored in the configuration file.

An embodiment of the personalization system includes a monitoring management module, a client statistics data store, a recommender system, and a content refinement module. The monitoring management module receives the logged information sent by the monitoring control module and stores it in the client statistics data store. The monitoring management module also configures the user behavior monitoring module (e.g., by sending the configuration file).

The recommender system determines user preferences based on the information stored in the client statistics data store. The content refinement module refines a set of content items by, for example, re-ordering the items, adding items, or removing items. The refinement is performed based on the user preferences determined by the recommender system. The set is refined so that the resulting content items (and their ordering) are more relevant to the user operating the image browser.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter, resort to the claims being necessary to determine such inventive subject matter.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
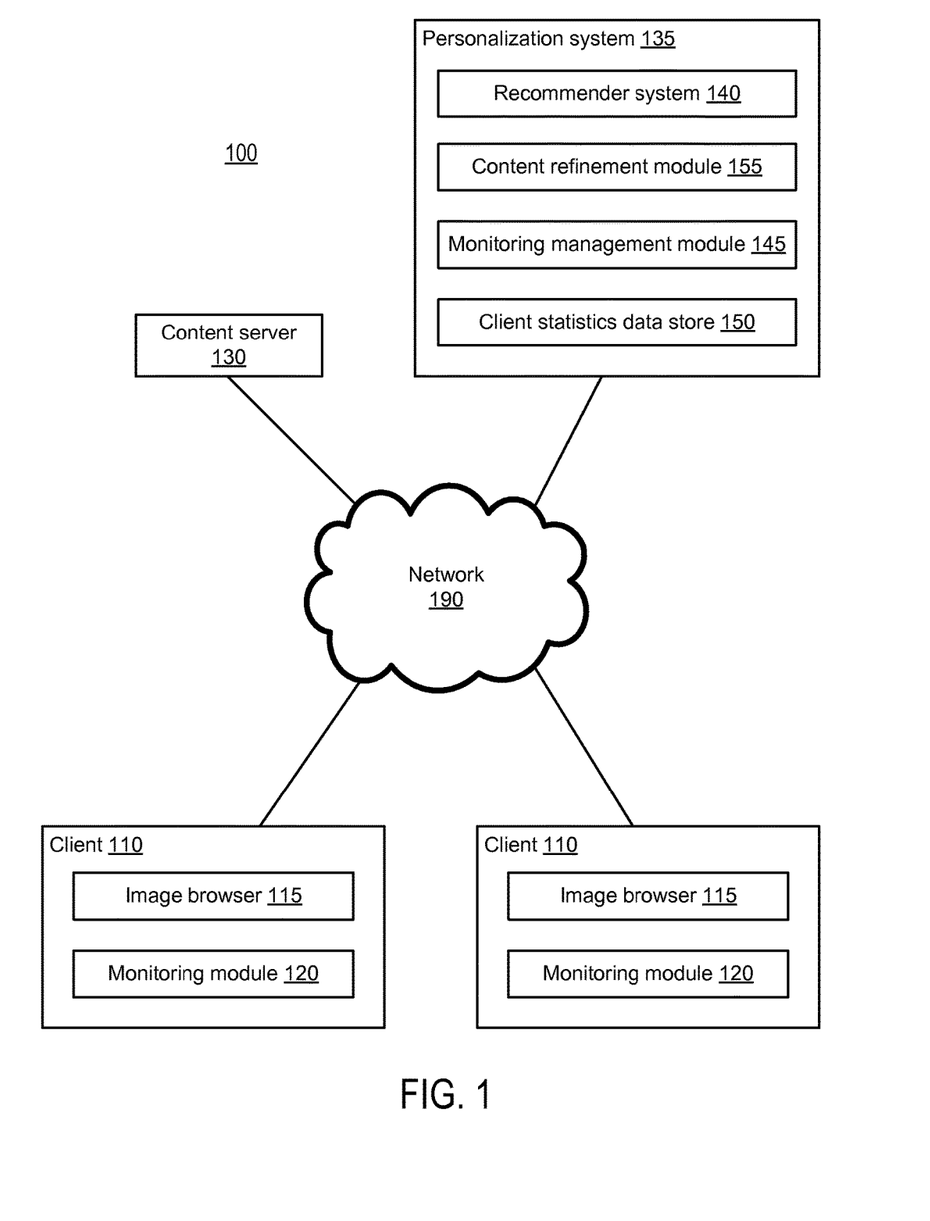
FIG. 1 is a high-level block diagram of a computing environment, according to one embodiment of the invention.

FIG. 1 is a high-level block diagram of a computing environment 100, according to one embodiment of the invention. FIG. 1 illustrates clients 110, a content server 130, and a personalization system 135 connected by a network 190. Only two clients 110 are shown in FIG. 1 in order to simplify and clarify the description. Embodiments of the computing environment 100 can have any number of clients 110 as well as multiple content servers 130 and/or multiple personalization systems 135.

Client

The clients 110 are computers or other electronic devices used by one or more users that can interact with the content server 130, the personalization system 135, or other entities (not shown). A client 110 can be, for example, a personal computer. In other embodiments, a client 110 is a network-capable device other than a computer, such as a personal digital assistant (PDA), a mobile telephone, a pager, a television "set-top box," etc. The client 110 executes an operating system (e.g., LINUX®, one of the versions of MICROSOFT WINDOWS®, or PALM OS®), which controls the operation of the client 110, and one or more application programs. In one embodiment, the client 110 includes an image browser 115 and a user behavior monitoring module 120. The client 110 can perform activities and make requests for or otherwise acquire information from the content server 130, the personalization system 135, or other entities connected to the network 190.

Image Browser—

The image browser 115 is a software application that enables a user to browse multiple images. The image browser can be a discrete application program, or it can be integrated into another application program (e.g., a web browser or a plug-in to a web browser) or into the client's operating system.

The word "image" is meant to include any type of visual content. An image can be, for example, a photograph, a drawing, a frame of video, or text (e.g., a web page or other document or portion thereof). An image can represent, for example, a content item (e.g., an electronic file of any type such as a video or a web page). The purpose of the image can be commercial (e.g., an advertisement or a picture of an item for sale) or non-commercial.

An image browser 115 is generally used to browse a set of images. A set of images can represent, for example, a set of search results (e.g., items that satisfy a search query) or a set of items that are associated in some way (e.g., content items that are referred to by the same file, such as a web page, or content items that are stored in the same logical location, such as an electronic folder or album).

In one embodiment, a user enters a search query into the image browser 115, and the image browser displays images representing content items that satisfy the query. In another embodiment, the image browser categorizes content items into different "channels" such as News, Sports, Music Videos, TV Episodes, etc. The user chooses a channel to view images that represent content items from that channel.

A set of images that is browsed using the image browser 115 is referred to as a "feed." A feed can be created by various user actions such as entering a search query, selecting a channel, or launching the image browser 115.

The client 110 receives, from the content server 130, an indication of which content items (or which images representing the content items) are to be displayed by the image browser 115. In one embodiment, an image is accessible from a web server. Rather than receiving the image from the content server 130, the client 110 receives instead the uniform resource identifier (URI) or uniform resource locator (URL) of the image and/or the URI or URL of the content item represented by the image (e.g., a video). The image browser 115 then uses the URIs/URLs to request the image and/or the content item from the web server using the network 190. The web server could be part of content server 130 or it could be an entirely different server (not shown). If the client 110 receives only the URI/URL of the content item, the image browser 115 is able to generate an image that represents that content item, so that the image browser 115 can display the image.

In one embodiment, the client 110 receives, from the content server 130, a file whose content adheres to the RSS XML web feed format with the Media RSS extension. Media RSS ("MRSS") is an RSS module that supplements the <enclosure> element capabilities of RSS 2.0 to enable more robust media syndication. MRSS was originally developed by Yahoo!.

Each Media RSS file contains entries for one or more content items. A content item entry includes, for example, a title, a description, a unique identifier, a content item URI, a thumbnail URI, a link URI, and a duration (e.g., if the content item is a video). The content item URI points to the content item itself. The thumbnail URI points to an image that represents the content item. (This representative image is displayed by the image browser 115 when the content item is viewed in thumbnail mode, discussed below.) The link URI points to a file (e.g., a web page) that contains the content item (or a reference thereto) and other information. For example, consider an article that contains both text and a video. The content item URI would point to the video (e.g., a file in Apple QuickTime format). The thumbnail URI would point to an image that represents that video (e.g., the first frame of the video). The link URI would point to the article.

The image browser 115 enables the user to navigate among different images. In one embodiment, the image browser displays multiple images simultaneously. Additional images, beyond those currently displayed, can also be viewed. To navigate to these images, the image browser provides functionality such as scrolling or loading a new "page" of images. In one embodiment, the image browser also enables a user to zoom in or out of the displayed images.

A user can experience a content item (e.g., video or web page) in various ways. For example, the user can view a "thumbnail" version of the content item rather than the content item itself. A thumbnail version of a source image is an image that is smaller and/or of a lower resolution than the source image itself. A thumbnail version of a video is similar, except that the image is a frame of the video. In one embodiment, the image browser displays content items in thumbnail mode so that more content items (e.g., more images) can be displayed simultaneously.

The user can also view an "intermediate" image that is larger and/or of a higher resolution than the thumbnail image. In one embodiment, in order to view an image in intermediate mode, the user selects the image from a group of simultaneously displayed thumbnail images. For example, the user single-clicks the desired thumbnail image. The desired image then increases in size and/or resolution from thumbnail mode to intermediate mode. The intermediate image is then displayed "on top of" the other thumbnail images.

The user can also view the content item in full-screen mode. In one embodiment, in order to view a content item in full-screen mode, the user selects the image (representing the content item) from a group of simultaneously displayed thumbnail images. For example, the user double-clicks the desired thumbnail image. The desired image then increases in size and/or resolution from thumbnail mode to full-screen mode and is displayed in isolation, without any of the other thumbnail images. Alternatively, if the desired image is already displayed in intermediate mode, the user selects the image (e.g., by clicking it). The desired image then increases in size and/or resolution from intermediate mode to full-screen mode and is displayed in isolation, without any of the other thumbnail images.

The user can interact with the image/content item in various ways. For example, the user can download the item, send a message or "tweet" referencing the item, bookmark the item, broadcast the item, and move a cursor into (i.e., over) or out of the image representing the item.

Depending on the type of the content item that is represented by the image, the user might be able to interact with the image/content item in additional ways. For example, if the image represents a video, the user can play the video. (In one embodiment, intermediate mode and full-screen mode each launch a software application that will enable the user to play a video. Thumbnail mode does not launch the software application because the display space allocated for the image/content item is considered to be too small for adequate viewing.) If the image represents a form (e.g., to sign up for a mailing list), the user can fill in the form. If the image represents a web page, the user can click on a link and load the target page into a web browser. If the image represents a game (e.g., implemented using the FLASH® platform from Adobe Systems Inc.), the user can play the game.

In one embodiment, the image browser 115 is similar to the "perspective image browser" described in U.S. Provisional Application No. 61/205,031, filed Jan. 13, 2009, entitled "Browsing Multiple Images Using Perspective Distortion and Scrolling," the entire disclosure of which is hereby incorporated by reference herein, including any appendices or attachments thereof, in its entirety for all purposes.

User Behavior Monitoring Module—

The user behavior monitoring module 120 ("monitoring module") is a software application that logs the operation of the image browser 115. Since the image browser 115 is controlled by a user, the operation of the image browser 115 indicates that user's behavior. The monitoring module 120 sends the logged information ("client statistics") to the personalization system 135. In one embodiment, the operation of the monitoring module 120 can be configured. The monitoring module 120 can be a discrete application program, or it can be integrated into another application program (e.g., the image browser 115) or into the client's operating system.

The user behavior monitoring module 120 will be further discussed below with reference to FIG. 3.

Content Server

The content server 130 serves information or content to client computers 110 or personalization system 135 via the network 190. For example, the content server 130 sends URIs, images, or content items to clients 110 for use with the image browser 115. As another example, the content server 130 sends a set of content item indications to personalization system 135 for refinement. The content server 130 can include a database that stores information. The content server 130 can send information stored in the database across the network 190 to the clients 110, the personalization system 135, or other entities (not shown).

As discussed above, the client 110 receives, from the content server 130, an indication of which content items (or which images representing the content items) are to be displayed by the image browser 115. The content server 130 determines which content items to indicate to the client 110.

For example, if a user enters a search query into the image browser 115, the content server 130 determines which content items the image browser 115 should display in response to the query. In one embodiment, processing a search query comprises two steps. The first step determines a set of content items that satisfy the query. The second step refines the set of content items by, for example, re-ordering the items, adding items, or removing items. The first step is performed by a search engine that is part of the content server 130 or part of another system (not shown). The second step is performed by the personalization system 135.

As another example, if the image browser 115 categorizes content items into different "channels" and a user chooses a channel, the content server 130 determines which content items the image browser 115 should display in response to the channel selection. In one embodiment, processing a channel selection comprises two steps. The first step determines a set of content items that are part of the channel. The second step refines the set of content items by, for example, re-ordering the items, adding items, or removing items. The first step is performed by the content server 130 or by another system (not shown). For example, each channel is associated with a list of content items that are part of the channel. The second step is performed by the personalization system 135.

Personalization System

The personalization system 135 serves information or content to client 110 or content server 130 via the network 190. For example, the personalization system 135 sends a set of refined content item indications to clients 110 for use with the image browser 115 or to content server 130. The personalization system 135 can include a database that stores information. The personalization system 135 can send information stored in the database across the network 190 to the clients 110, the content server 130, or other entities (not shown). In one embodiment, the personalization system 135 includes a recommender system 140, a content refinement module 155, a monitoring management module 145, and a client statistics data store 150. Modules of the personalization system 135 can be located within the content server 130, within the client 110, or separately (as part of a stand-alone personalization system 135).

Recommender System—

The recommender system 140 is a software application that determines user preferences based on the information stored in the client statistics data store 150. The recommender system 140 can be a discrete application program, or it can be integrated into another application program or into the server's operating system.

The recommendation approach of the recommender system 140 can be content-based, collaborative, or a hybrid of the two. With a content-based approach, the user will be recommended items similar to those he preferred in the past. With a collaborative approach, the user will be recommended items that people with similar tastes and preferences liked in the past. A hybrid approach combines the content-based approach and the collaborative approach.

The recommendation technique of the recommender system 140 can be heuristic-based or model-based. With a heuristic-based technique (sometimes referred to as a memory-based technique), heuristics are determined that make rating predictions based on the entire collection of items previously rated by the user(s). With a model-based technique, the collection of ratings is used to learn a model, which is then used to make rating predictions.

Recommender systems will be further discussed below and are also discussed in "Toward the Next Generation of Recommender Systems: A Survey of the State-of-the-Art and Possible Extensions," by G. Adomavicius, et al., IEEE Transactions on Knowledge and Data Engineering, Vol. 17, No. 6, June 2005.

Content Refinement Module—

The content refinement module 155 is a software application that refines a set of content items by, for example, re-ordering the items, adding items, or removing items. The refinement is performed based on user preferences determined by the recommender system 140. The set is refined so that the resulting content items (and their ordering) are more relevant to the user operating the image browser 115. Note that the set of content items to be refined can include both advertisements and non-advertisements. Also, the items that are added or removed can also be either advertisements or non-advertisements.

The refinement can also be performed based on client statistics stored in the client statistics data store 150. For example, consider deciding whether to display a particular advertisement to a particular user. In one embodiment, if the ad has been displayed to that user recently (e.g., within a particular time period), then the ad will not be displayed to the user (i.e., refinement removes the ad from the set of content items) and might be replaced by a different ad (i.e., refinement adds the different ad to the set of content items). Similarly, consider an ad campaign where the advertiser has paid for an ad to be displayed 1,000 times. After the ad has been displayed 1,000 times (as determined based on client statistics stored in the client statistics data store 150 for various users), the ad is no longer displayed (i.e., refinement removes the ad from the set of content items).

Figure 2:
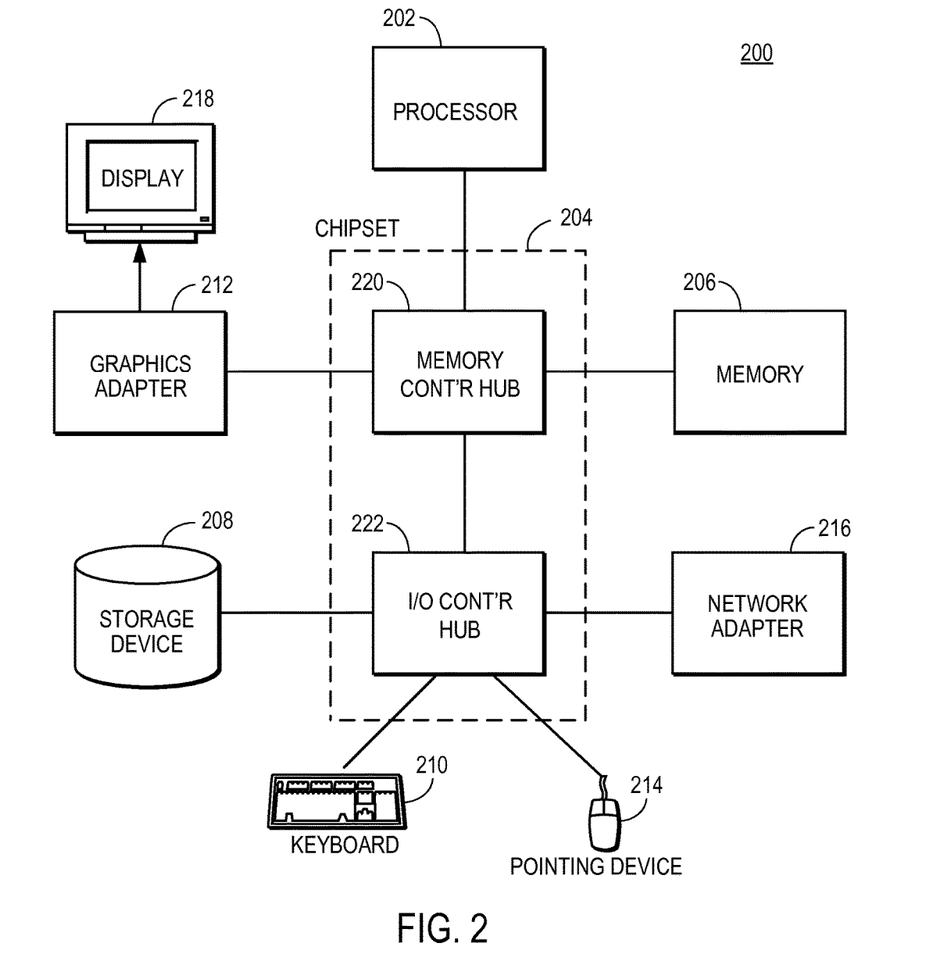
FIG. 2 is a high-level block diagram of a computer system for use with the invention.

The refinement can also be performed based on information about the capabilities of the client 110. For example, the client 110 will have a display 218 and might also have a graphics card. In one embodiment, if the client 110 has a powerful graphics card and a sophisticated display, then content items that are graphics-intensive (e.g., with three-dimensional images) will be displayed (i.e., refinement adds the graphics-intensive item to the set of content items). Alternatively, if the client 110 lacks a graphics card and a sophisticated display, then content items that are graphics-intensive (e.g., with three-dimensional images) will not be displayed (i.e., refinement removes the graphics-intensive item from the set of content items).

The content refinement module 155 can be a discrete application program, or it can be integrated into another application program (e.g., the recommender system 140) or into the server's operating system. The content refinement module 155 will be further discussed below.

Monitoring Management Module—

As discussed above, the user behavior monitoring module 120 sends logged information ("client statistics") to the personalization system 135. The monitoring management module 145 is a software application that receives the client statistics and stores them in the client statistics data store 150. If the monitoring module 120 can be configured, the monitoring management module 145 also configures the monitoring module 120 (e.g., by sending the client 110 a configuration file, discussed below). The monitoring management module 145 can be a discrete application program, or it can be integrated into another application program or into the server's operating system.

Client Statistics Data Store—

As discussed above, the user behavior monitoring module 120 logs the operation of the image browser 115 and sends the logged information ("client statistics") to the personalization system 135. The monitoring management module 145 stores these statistics in the client statistics data store 150. In one embodiment, the client statistics data store 150 comprises a database.

Information in the client statistics data store 150 can be used in various ways. In one embodiment, the information is used by the recommender system to determine user preferences. This usage will be discussed below.

In another embodiment, the information is used to charge advertisers for advertisements ("ads") that are delivered via the image browser 115. The image browser enables a user to experience content items, and these content items can be ads. In one embodiment, the amount of money charged for an ad that is delivered by the image browser 115 varies based on how the user experienced and/or interacted with the ad. In this way, if a user's behavior indicates more interest in an ad, more money can be charged for delivery of that ad.

For example, if the ad was displayed in thumbnail mode, a first amount is charged. If the ad was displayed in intermediate mode, a second amount is charged. If the ad was displayed in full-screen mode, a third amount is charged. If the user interacted with the ad, a fourth amount is charged. In one embodiment, since interaction with the ad indicates higher user interest than the launch of full-screen mode, and the launch of full-screen mode indicates higher user interest than the launch of intermediate mode, and the launch of intermediate mode indicates higher user interest than the mere display of thumbnail mode, the fourth amount is the highest, followed by the third amount, the second amount, and the first amount (the lowest).

The first amount, second amount, and third amount can vary based on how long the ad was displayed. The first amount can also vary based on the context in which the ad was displayed (e.g., displayed while moving during a scroll operation versus displayed in a stationary position). The fourth amount can vary based on the nature and/or the extent of the user interaction.

In one embodiment, the amount charged for delivery of an ad depends on whether the user "viewed" the ad and for how long. "Viewing" is defined as interacting with the image browser 115 (e.g., scrolling, selecting, or clicking) while the ad is being displayed. The time period would be determined based on the user interacting with the image browser periodically (e.g., once every second or once every few seconds).

Network

The network 190 enables communications among the entities connected to it. In one embodiment, the network 190 uses standard communications technologies and/or protocols. Thus, the network 190 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 190 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 190 can be represented using technologies and/or formats including the hypertext markup language (HTML), the extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. In another embodiment, the entities use custom and/or dedicated data communications technologies instead of, or in addition to, the ones described above. Depending on the embodiment, the network 190 can also include links to other networks such as the Internet. In one embodiment, the network 190 is the Internet.

Computer System

FIG. 2 is a high-level block diagram of a computer system 200 for use as a client 110, a content server 130, and/or a personalization system 135. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, keyboard 210, pointing device 214, and network adapter 216 are coupled to the I/O controller hub 222. Other embodiments of the computer system 200 have different architectures. For example, the memory 206 is coupled directly to the processor 202 in some embodiments.

The storage device 208 is a machine-readable storage medium such as a hard drive, compact disk read-only memory (CD-ROM), DVD, or solid-state memory device. The memory 206 holds instructions and data used by the processor 202. The pointing device 214 is a mouse, track ball, touch screen, or other type of pointing device and is used in combination with the keyboard 210 to input data into the computer system 200. The graphics adapter 212 displays images and other information on the display device 218. The network adapter 216 couples the computer system 200 to the network 190. Some embodiments of the computer system 200 have different and/or other components than those shown in FIG. 2.

The types of computer systems 200 used by the entities of FIG. 1 can vary depending upon the embodiment and the processing power used by the entity. For example, a client 110 that is a mobile telephone typically has limited processing power and a small display 218 and might lack a keyboard 210 and a pointing device 214. The content server 130 or personalization system 135, in contrast, may comprise multiple blade servers working together to provide the functionality described herein. Moreover, the storage device 208 can be local and/or remote from the computer system 200 (e.g., embodied within a storage area network (SAN)).

The computer system 200 is adapted to execute computer program modules for providing functionality described herein. As used herein, the term "module" refers to executable computer program instructions and/or other logic used to provide the specified functionality. Thus, a module can be implemented in hardware, firmware, and/or software. In one embodiment, program modules are stored on the storage device 208, loaded into the memory 206, and executed by the processor 202.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

User Behavior Monitoring Module

Figure 3:
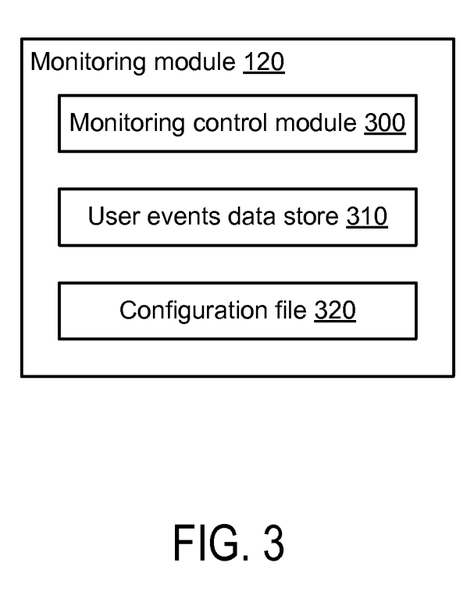
FIG. 3 is a high-level block diagram of the functional modules within a user behavior monitoring module, according to one embodiment of the invention.

FIG. 3 is a high-level block diagram of the functional modules within the user behavior monitoring module 120 ("monitoring module"), according to one embodiment of the present invention. The monitoring module 120, in the embodiment illustrated in FIG. 3, includes a monitoring control module 300, a user events data store 310, and a configuration file 320. Some embodiments of the monitoring module 120 have different and/or additional modules than those shown in FIG. 3. Likewise, the functionalities can be distributed among the modules in a manner different than described herein. Certain modules and functions can be incorporated into other modules of the client 110 and/or other entities on the network 190, including the content server 130 and the personalization system 135.

Monitoring Control Module—

The monitoring control module 300 logs information about the operation of the image browser 115. The logged information is in the form of "events" and is stored in the user events data store 310. The monitoring control module 300 can log various types of events, such as content item events, advertisement events, feed events, search events, and user interface events. Each type of event can be associated with different settings that affect whether and/or how the event is logged, such as format (level of detail being logged—full information versus aggregated/anonymized information) and sampling (whether to log all of the events that occur, half of the events that occur, etc.).

The monitoring control module 300 sends the logged information to the personalization system 135 as part of a "client statistics report." In one embodiment, the client statistics report includes the contents of the user events data store 310, information about the image browser 115, and information about hardware of the client 110. The monitoring control module 300 sends the client statistics report to the personalization system 135 when a trigger occurs. The trigger is configurable.

Configuration File—

The monitoring control module 300 operates in accordance with various settings that are stored in the configuration file 320. In one embodiment, these settings include transmission triggers and the format and sampling settings associated with the various types of events (content item events, advertisement events, feed events, search events, and user interface events).

In one embodiment, the configuration file 320 is stored in a serialized, binary format that is not human-readable (e.g., the Protocol Buffer format from the Google Code API). Appendix A is a sample configuration file 320 that has been translated to human-readable format. The sample configuration file includes explanatory comments, which are preceded by the "#" character.

The beginning of the configuration file in App. A concerns the transmission triggers (see "log_buffering_params"). In one embodiment, there are four types of triggers that can cause the monitoring control module 300 to send a client statistics report to the personalization system 135: the number of logged events (of any type) reaching a first pre-defined threshold; the number of logged advertisement ("ad") events reaching a second pre-defined threshold; the expiration of a timer; and the end of an image browser 115 session. (Regarding the end of a session, see "CoolirisCloseEvent" in Appendix B, discussed below.)

The "max_events" value indicates the threshold number of logged events of any type (5000 in App. A). The "max_ad_events" value indicates the threshold number of logged ad events (5 in App. A). The "max_delay_seconds" value indicates the time period measured in seconds (3600 in App.

A, which equals one hour). (The concept of the end of an image browser session is not configurable, so it is not included in the configuration file.)

In one embodiment, the monitoring control module 300 sends the client statistics report whenever any of the triggers occurs, regardless of the type of the trigger. If a trigger occurs more frequently, then client statistics reports are sent to the personalization system 135 more frequently, and information stored in the client statistics data store 150 is more up-to-date. More up-to-date information means that the recommender system 140, which uses that information, will determine a user's preferences based on the user's recent behavior rather than behavior that occurred long ago. As a result, the preferences will reflect the user's current interests.

The remainder of the configuration file in App. A concerns the format and sampling settings associated with the various types of events (content item events, advertisement events, feed events, search events, and user interface events). In the configuration file, these settings are referred to as "log_sampling."

The "percent" value indicates the percent of events that should be logged (e.g., "100" in App. A). The "search events" value indicates the format that should be used when logging search events (e.g., "kLogEverything" in App. A). (Values are similarly assigned to "client_events", "ad_events", "content_events", and "feed_events".) A value can be kLogEverything, kLogAnonymized, or kLogNothing.

Log Format—

Appendix B is a description of a sample format that the monitoring control module 300 uses to log events. The description includes explanatory comments, which are preceded by the "II" characters. In one embodiment, the contents of the user events data store 310 are translated to a serialized format (e.g., the Protocol Buffer format from the Google Code API) before they are transmitted to the personalization system 135 as part of the client statistics report.

When the format value is "kLogAnonymized", information that is logged includes, for example: a timestamp indicating when the event occurred, the type of the event, the "role" of the content item (ad versus non-ad), and the uniform type identifier (UTI) of the content item (e.g., "image"). The type of the event can be, for example, show thumbnail mode, show intermediate mode ("selected wall"), show full-screen mode ("selected full screen"), follow link, download, send message, tweet, bookmark ("star"), broadcast, move cursor within ("mouse in"), and percentage of video played (see "ItemEventType" in App. B). (Although App. B shows video percentages at 25, 50, 75, and 100, any percentages can be used.) Transition from one view mode to another view mode (e.g., from thumbnail mode to intermediate mode) can also be logged (see "ViewModeChangeEvent" in App. B).

In one embodiment, multiple anonymized events are grouped (aggregated) into a single event if they share the same event type, role, and UTI (see "ItemEventSummary" in App. B). Although the URI of the content item is not logged, the URI of the feed that contains the content item is logged (as part of a feed event, see below).

When the format value is "kLogEverything", information that is logged is divided into two groups. The first group concerns the content item in general and includes, for example: a local identifier for the content item (unique within the user events data store 310), the role of the content item, the UTI of the content item, the URI of the content item (<media:content> element in MRSS, "content_uri" in App. B), the URI of a file that contains or refers to the content item (<link> element in RSS, "link_uri" App. B), and a globally unique identifier (GUID) for the content item (see "ItemIntro" in App. B). The second group concerns a particular event and includes, for example: the local identifier of the content item associated with the event (used to identify the relevant "ItemIntro" entry), a timestamp indicating when the event occurred, and the type of the event (see "ItemEvent" in App. B). In one embodiment, the URI of the image representing the content item (<media:thumbnail> element in MRSS) is not logged.

When the format value is "kLogNothing", no information is logged.

The format and sampling settings can change based on the feed that was being browsed when the events occurred. For example, a regular expression can be compared to the URI of the feed. If the regular expression matches the URI, then particular format and sampling settings are used (see "feed_config" in App. A).

As mentioned above, the monitoring control module 300 can log various types of events, such as content item events, advertisement events, feed events, search events, and user interface events. The format for logging each type of event is described in App. B.

Content Item Event—

When the user selects (e.g., clicks) an image that is displayed by the image browser 115, and the image is not an advertisement, a content item event is created. The logging format can be either kLogEverything ("ItemEvent" and "ItemIntro", where "ItemRole" has a value of kRoleContent) or kLogAnonymized ("ItemEventSummary"), which were described above.

Advertisement (Ad) Event—

When the user selects (e.g., clicks) an image that is displayed by the image browser 115, and the image is an advertisement, an ad event is created. The logging format can be either kLogEverything ("ItemEvent" and "ItemIntro", where "ItemRole" has a value of kRoleAd) or kLogAnonymized ("ItemEventSummary"), which were described above. In one embodiment, the log format of an ad event is similar to the log format of a content item event except that the ad event might contain more detailed information about the user's behavior, such as the user's interaction with the ad.

Feed Event—

When a feed is loaded into the image browser 115, a feed event is created. The feed event includes, for example, a timestamp indicating when the feed was loaded, the user action that caused the feed to be loaded (e.g., entering a search query or selecting a channel; see "StartFeedMode" in App. B), and the URI of the feed (see "StartFeedEvent" in App. B). Similarly, when a feed is exited, a feed event is also created (see "EndFeedEvent" in App. B).

Search Event—

When the user enters a search query, a search event is created. The search event includes, for example, a timestamp indicating when the search query was entered, the search query itself, and the search engine that was selected to execute the query (e.g., Google Images or YouTube) or the channel that was selected to search (e.g., Music Videos or TV Episodes) (see "SearchEvent" in App. B).

User Interface (UI) Event—

When the user navigates within the image browser 115 display (e.g., by scrolling or zooming), a first type of UI event is created. This first UI event includes, for example, an event type (e.g., zoom in/out or click/drag scrollbar) and a timestamp indicating when the event occurred (see "BackgroundEvent" in App. B). When the user clicks a button (not a content item) within the image browser 115 display, a second type of UI event is created. This second UI event includes, for example, the name of the button and a time-stamp indicating when the event occurred (see "Button-ClickEvent" in App. B).

Recall that a client statistics report includes the contents of the user events data store 310, information about the image browser 115, and information about hardware of the client 110. Information about the image browser 115 includes, for example, information about the user (GUID, login name, locale, time zone), the user's device (operating system, web browser, image browser), and the user's preferences (see "ClientInfo" in App. B). Information about hardware of the client 110 includes, for example, information about the client's renderer (OpenGL, etc.), system architecture (e.g., CPU architecture, CPU speed, and RAM size), and display (e.g., screen width, height, and color depth) (see "ClientInfo" in App. B).

Appendix C is a sample client statistics report that has been translated to human-readable format (see "UserActivityLog" in App. B). The description includes explanatory comments, which are preceded by the "//" characters.

Operation—

Figure 4:
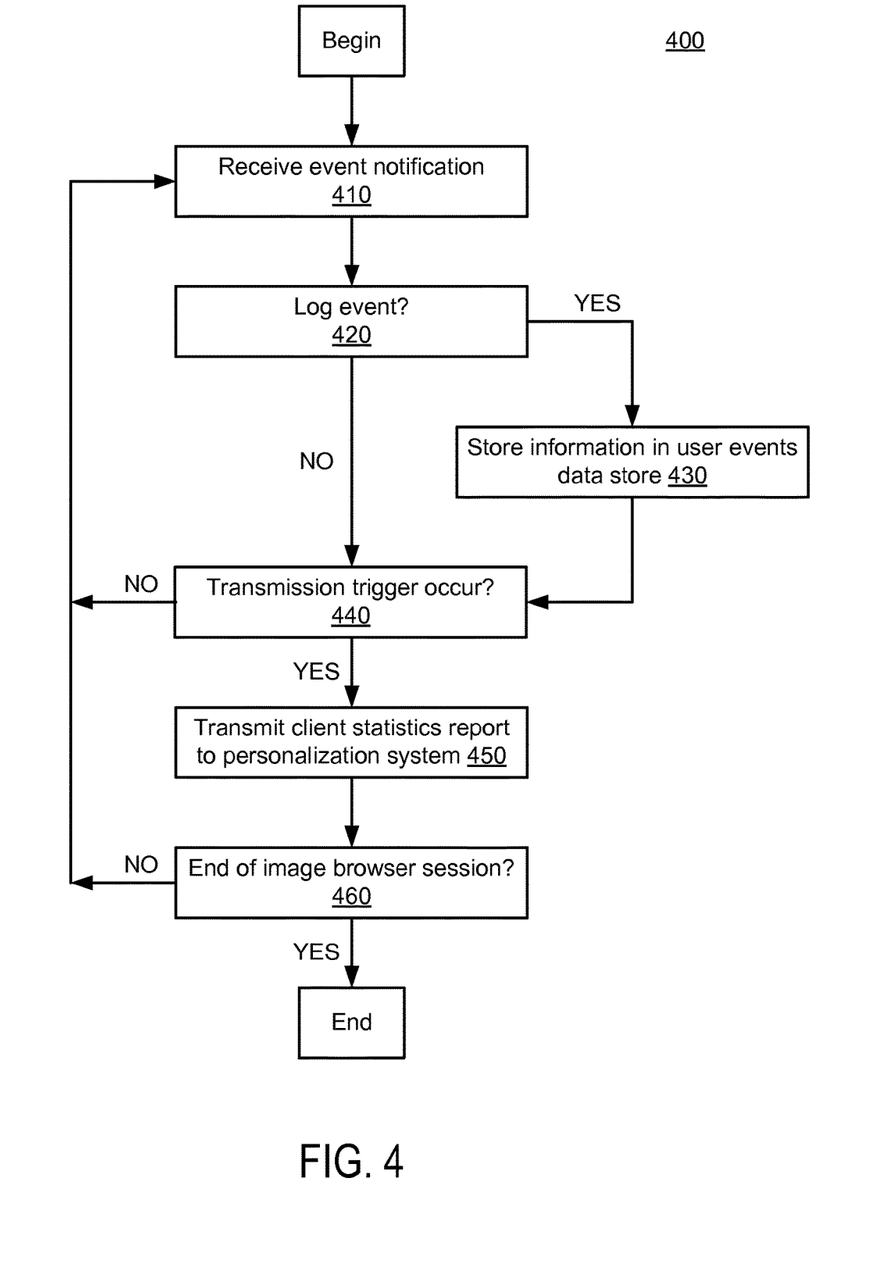
FIG. 4 is a flowchart of steps performed to monitor a user's behavior, according to one embodiment of the invention.

Referring now to FIG. 4, there is shown a flowchart of steps performed to monitor a user's behavior, according to one embodiment of the invention. The steps are performed by, for example, the user behavior monitoring module 120. It should be understood that these steps are illustrative only. Different embodiments of the monitoring module 120 may perform the illustrated steps in different orders, omit certain steps, and/or perform additional steps not shown in FIG. 4.

As shown in FIG. 4, the method 400 starts when the monitoring module 120 (specifically, the monitoring control module 300) receives 410 notification that an event has occurred. The monitoring control module 300 determines 420 whether to log the event. For example, the monitoring control module 300 accesses the configuration file 320 to determine the format and sampling settings associated with this type of event. If the event should be logged, the monitoring control module 300 stores 430 the appropriate information (based on the format indicated by the configuration file) in the user events data store 310 and then proceeds to step 440. If the event should not be logged, the monitoring control module 300 proceeds directly to step 440, without storing any information in the user events data store 310.

The monitoring control module 300 determines 440 whether a transmission trigger has occurred. For example, the monitoring control module 300 accesses the configuration file 320 to determine the settings associated with the transmission triggers. If a transmission trigger has not occurred, the monitoring control module 300 returns to step 410 to receive notification of the next event. If a transmission trigger has occurred, the monitoring control module 300 transmits 450 a client statistics report to the personalization system 135 and then proceeds to step 460. The monitoring control module 300 determines 460 whether the image browser session has ended. If the session has ended, the method ends. If the session has not ended, the monitoring control module 300 returns to step 410 to receive notification of the next event.

Personalization System

As illustrated in FIG. 1, a personalization system 135 includes (in part) a recommender system 140, a content refinement module 155, and a client statistics data store 150. The recommender system 140 determines user preferences based on the information stored in the client statistics data store 150 (i.e., based on user events/behavior). The content refinement module 155 refines a set of content items based on the user preferences determined by the recommender system 140. The personalization system 135 will now be described in the context of the present invention.

First, note that there are many ways for the recommender system 140 to determine a user rating for a content item. One way is to prompt the user to explicitly rate the item. Another way is to determine a rating implicitly based on past user behavior (e.g., based on information stored in the client statistics data store 150, such as search queries that were entered or content items that were bookmarked or downloaded). The recommender system 140 can identify a particular user based on various information stored in the "ClientInfo" portion of "UserActivityLog" (see App. B).

In one embodiment, the personalization system 135 is used by the content server 130. For example, the content server 130 determines a set of content items that satisfy a search query or that are associated with a selected channel. The content server 130 sends the set of items (or references thereto) to the personalization system 135 for refinement by the content refinement module 155. The content refinement module 155 determines a refined set of items, and the refined set is sent from the personalization system 135 to the content server 130. The content server 130 then sends the refined set to the client 110 for display using the image browser 115.

In another embodiment, the personalization system 135 is used by the client 110. For example, the client 110 receives a raw (i.e., unrefined) set of content items from a system (e.g., a search engine) that is not configured to work with the personalization system 135. The client 110 sends the set of items (or references thereto) to the personalization system 135 for refinement by the content refinement module 155. The content refinement module 155 determines a refined set of items, and the refined set is sent from the personalization system 135 to the client 110 for display using the image browser 115.

As mentioned above, modules of the personalization system 135 can be located within the content server 130, within the client 110, or separately (as part of a stand-alone personalization system 135). In one embodiment, the content refinement module 155 is located within the client 110. In this embodiment, the personalization system 135 sends the client 110 the output of the recommender system 140 (namely, user preferences determined from the client statistics data store 150). The content refinement module 155 within the client 110 uses the user preferences to refine a set of content items.

Similarly, the content refinement module 155 can be located within the content server 130. In this embodiment, the personalization system 135 sends the content server 130 the output of the recommender system 140 (namely, user preferences determined from the client statistics data store 150). The content refinement module 155 within the content server 130 uses the user preferences to refine a set of content items.

In another embodiment, the recommender system 140 is located within the client 110. In this embodiment, the recommender system 140 determines user preferences based on the contents of the user events data store 310. The determined user preferences are sent from the client 110 to the personalization system 135, where they can be used by the content refinement module 155. Note that since the recommender system 140 determines user preferences based on the contents of the user events data store 310, the client statistics data store 150 is not necessary, and a client statistics report is not sent from the client 110 to the personalization system 135.

Also, a user's behavior vis-à-vis a particular content item (implicitly indicating the user's rating of that content item) can be based on any of several characteristics of the item. For example, the user might like watching videos, so he frequently launches videos in full-screen mode and plays them. Based on this behavior, the recommender system 140 can determine user preferences regarding videos, and the content refinement module 155 can refine a set of content items to include more videos and/or rank videos higher in the list.

As another example, the user might like sharing content regarding celebrities, so he frequently tweets celebrity-related content items, regardless of whether they are images, videos, or advertisements. Based on this behavior, the recommender system 140 can determine user preferences regarding celebrity-related content items, and the content refinement module 155 can refine a set of content items to include more celebrity-related content items and/or rank celebrity-related content items higher in the list.

As yet another example, the user might like revisiting content from CNN, so he frequently bookmarks CNN-sourced content items, regardless of whether they are images, videos, or advertisements. Based on this behavior, the recommender system 140 can determine user preferences regarding CNN-sourced content items, and the content refinement module 155 can refine a set of content items to include more CNN-sourced content items and/or rank CNN-sourced content items higher in the list.

Recall that the client 110 receives, from the content server 130, an indication of which content items (or which images representing the content items) are to be displayed by the image browser 115. In one embodiment, the client 110 receives, from the content server 130, a Media RSS ("MRSS") file that contains entries for one or more content items. Each MRSS file specifies a group of content items and an ordering for those items. The image browser 115 enables the user to navigate among those content items in that order.

Now, recall that the user behavior monitoring module's transmission triggers can be configured so that the client 110 frequently sends client statistics reports to the personalization system 135. When reports are sent in real-time (rather than delayed), the recommender system 140 can determine user preferences in real-time, and the content refinement module 155 can refine a set of content items in real-time also. As a result, the refinement will reflect the user's current interests.

Although the refinement module 155 can refine a set of content items in real-time, it cannot refine a set of content elements that has already been transmitted to the client (e.g., in the form of an MRSS file) and is being displayed by the image browser 115. That is why, in one embodiment, the content server 130 does not indicate to the client 110, all at once, all of the content items that the user has requested (e.g., all of the content items that are in a channel or all of the content items that satisfy a query). Instead, the content server 130 indicates the content items in piecemeal fashion in smaller groups. This enables the user's behavior with respect to a first group of items to be logged, sent to the personalization system 135, processed by the recommender system 140, and used by the content refinement module 155 to refine a second group of items before the second group is sent to the client 110. In this way, the user's recent behavior is used in real-time to improve the user's browsing experience.

In one embodiment, when the image browser 115 is displaying a first group of content items indicated by a first MRSS file, the client 110 sends a request to the content server 130 for the next group of content items (if necessary). This pre-fetching enables the user to later navigate and scroll through the items quickly but does not cause too much network overhead.

An MRSS file can reference any number of content items. As the number of content items increases, the client 110 requests the next MRSS file from the content server 130 less and less frequently. Less frequent requests result in less network overhead and less waiting time for the user. However, less frequent requests also result in less relevant content items, since the content refinement module 155 cannot refine content item groups that are already being displayed at the client 110. If content item groups (MRSS files) are sent to the client less frequently, then there will be a greater lag time between a user's behavior and that behavior affecting future content items. The real-time nature of the personalization system 135 will diminish accordingly. In one embodiment, in an effort to balance these competing considerations, each MRSS file references about 20-30 content items.

Note that although the content refinement module 155 cannot refine a set of content elements that is being displayed by the image browser 115, the real-time nature of the personalization system 135 can still be used. For example, in one embodiment, the image browser 115 can recommend other content items to the user based on a content item selected by the user. In this embodiment, the recommendations are based on the user preferences determined by the recommender system 140. The user preferences, in turn, are based on the user's recent behavior as logged by the user behavior monitoring module 120 and processed by the recommender system 140.

The above description is included to illustrate the operation of the embodiments and is not meant to limit the scope of the invention. The scope of the invention is to be limited only by the following claims. From the above discussion, many variations will be apparent to one skilled in the relevant art that would yet be encompassed by the spirit and scope of the invention.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Further, the features and advantages described in the specification provide a beneficial use to those making use of a system and a method as described in embodiments herein. For example, a user is provided mechanisms, e.g., by receiving and/or transmitting control signals, to browse desired visual content as described herein. Further, these benefits accrue regardless of whether all or portions of components, e.g., server systems, to support their functionality are located locally or remotely relative to the user.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

In addition, some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

As will be understood by those familiar with the art, the invention may be embodied in other specific forms without departing from the spirit or essential characteristics thereof. Likewise, the particular naming and division of the modules, managers, features, attributes, methodologies and other aspects are not mandatory or significant, and the mechanisms that implement the invention or its features may have different names, divisions, and/or formats. Furthermore, as will be apparent to one of ordinary skill in the relevant art, the modules, managers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language or for any specific operating system or environment. Accordingly, the disclosure of the present invention is intended to be illustrative, but not limiting, of the scope of the invention, which is set forth in the following claims.

We claim:

1. A method comprising:
   executing, in a web browser executed by a processor, an image browser, the image browser configured to display one or more content items;
   pre-fetching, by the image browser, the one or more content items, each of the content items associated with a uniform type identifier (UTI) and a role of either content or advertisement, the pre-fetching comprising retrieving one or more uniform resource identifiers (URIs) of the one or more content items from a web server;
   displaying, by the image browser, the one or more content items based on the one or more URIs;
   reading, by a user behavior monitoring module executed by the processor, a configuration file, the configuration file including at least one transmission trigger and sampling settings, the sampling settings defining a percentage of events to log;
   generating, by the user behavior monitoring module based on the sample settings, a log of events representing interactions with the image browser by:
      detecting, by the user behavior monitoring module, that a current event associated with a displayed content item has occurred, the current event being associated with a type and a timestamp,
      identifying, by the user behavior monitoring module, at least one historical event associated with a second content item, the historical event having the same type as the current event and the second content item having the same role and UTI as the content item, and
      generating, by the user behavior monitoring module, an aggregated event, the aggregated event including the type of the event, the UTI, the role, and a number representing how many events are in the aggregated event;
   generating, by the user behavior monitoring module, a client statistics report including at least a portion of the log in response to determining that a transmission trigger has occurred; and
   transmitting, by the user behavior monitoring module over a network, the client statistics report to a remote personalization system.

2. The method of claim 1, wherein the type comprises displaying a content item in thumbnail mode, displaying a content item in intermediate mode, or displaying a content item in full-screen mode.

3. The method of claim 1, wherein a content item is further associated with a uniform resource identifier (URI) that points to the content item.

4. The method of claim 1, wherein a content item is further associated with a uniform resource identifier (URI) that points to the image representing the content item.

5. The method of claim 1,
   wherein the type comprises downloading a content item, bookmarking a content item, or broadcasting a content item.

6. The method of claim 1,
wherein the type comprises sending a message referencing a content item.

7. The method of claim 1,
wherein the type comprises playing a video.

8. A non-transitory computer readable storage medium comprising computer code for execution by a processor, the computer code causing the processor to perform steps comprising:
executing, in a web browser executed by the processor, an image browser, the image browser configured to display one or more content items;
pre-fetching, by the image browser, the one or more content items, each of the one or more content items associated with a uniform type identifier (UTI) and a role of either content or advertisement, the pre-fetching comprising retrieving one or more uniform resource identifiers (URIs) of the one or more content items from a web server;
displaying, by the image browser, the one or more content items based on the one or more URIs;
reading, by a user behavior monitoring module executed by the processor, a configuration file, the configuration file including at least one transmission trigger and sampling settings, the sampling settings defining a percentage of events to log;
generating, by the user behavior monitoring module based on the sample settings, a log of events representing interactions with the image browser by:
detecting, by the user behavior monitoring module, that a current event associated with a displayed content item has occurred, the current event being associated with a type and a timestamp,
identifying, by the user behavior monitoring module, at least one historical event associated with a second content item, the historical event having the same type as the current event and the second content item having the same role and UTI as the content item, and
generating, by the user behavior monitoring module, an aggregated event, the aggregated event including the type of the event, the UTI, the role, and a number representing how many events are in the aggregated event;
generating, by the user behavior monitoring module, a client statistics report including at least a portion of the log in response to determining that a transmission trigger has occurred; and
transmitting, by the user behavior monitoring module over a network, the client statistics report to a remote personalization system.

9. The medium of claim 8, wherein the type comprises displaying a content item in thumbnail mode, displaying a content item in intermediate mode, or displaying a content item in full-screen mode.

10. The medium of claim 8, wherein the type comprises downloading a content item, bookmarking a content item, or broadcasting a content item.

11. A system comprising:
a processor;
a storage medium for tangibly storing thereon program logic for execution by the processor, the stored program logic comprising:
image browser execution logic executed in a web browser executed by the processor for executing an image browser, the image browser configured to display one or more content items;
pre-fetch logic executed by the image browser for pre-fetching, by the image browser, the one or more content items, each of the one or more content items associated with a uniform type identifier (UTI) and a role of either content or advertisement, the pre-fetching comprising retrieving one or more uniform resource identifiers (URIs) of the one or more content items from a web server;
display logic, executed by the image browser, for displaying the one or more content items based on the one or more URIs;
reading logic executed by a user behavior monitoring module executed by the processor for reading a configuration file, the configuration file including at least one transmission trigger and sampling settings, the sampling settings defining a percentage of events to log;
first generating logic executed by the user behavior monitoring module for generating, based on the sample settings, a log of events representing interactions with the image browser, the first generating logic comprising:
detecting logic executed by the user behavior monitoring module for detecting that a current event associated with a displayed content item has occurred, the current event being associated with a type and a timestamp,
identifying logic executed by the user behavior monitoring module for identifying at least one historical event associated with a second content item, the historical event having the same type as the current event and the second content item having the same role and UTI as the content item, and
second generation logic executed by the user behavior monitoring module for generating an aggregated event, the aggregated event including the type of the event, the UTI, the role, and a number representing how many events are in the aggregated event;
third generating logic executed by the user behavior monitoring module for generating a client statistics report including at least a portion of the log in response to determining that a transmission trigger has occurred; and
transmitting logic executed by the user behavior monitoring module for transmitting, over a network, the client statistics report to a remote personalization system.

12. The system of claim 11, wherein the type comprises displaying a content item in thumbnail mode, displaying a content item in intermediate mode, or displaying a content item in full-screen mode.

13. The system of claim 11, wherein the type comprises downloading a content item, bookmarking a content item, or broadcasting a content item.

14. The method of claim 1, further comprising:
determining whether a trigger associated with one or more events occurs; and
responsive to determining the trigger occurs, determining preferences for content items based on the stored events.

15. The method of claim 14, wherein the trigger comprises a trigger selected from a trigger type consisting of: a number of stored events reaching a first threshold, a number of stored events having a specified type reaching a second threshold, expiration of a time interval, or completion of a session operating the image browser.

* * * * *